Figure 1:
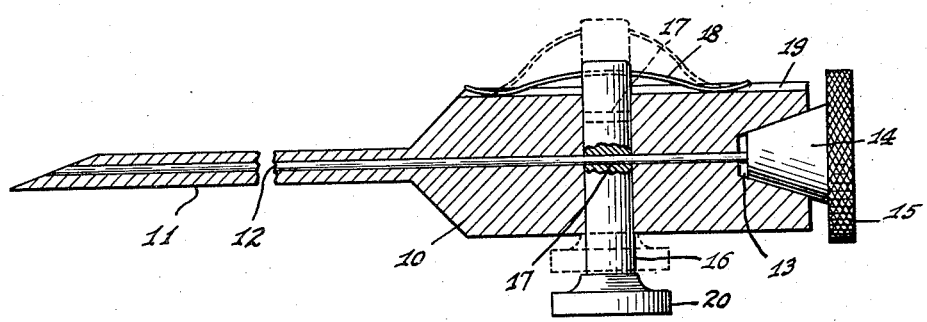

March 12, 1946.   P. V. THOMPSON   2,396,351
DEVICE FOR MEASURING PRESSURE OF THE SPINAL FLUID
Filed July 13, 1944

INVENTOR.
PAUL V. THOMPSON,
BY
ATTORNEYS.

Patented Mar. 12, 1946

2,396,351

UNITED STATES PATENT OFFICE 2,396,351

DEVICE FOR MEASURING PRESSURE OF THE SPINAL FLUID

Paul V. Thompson, Indianapolis, Ind.

Application July 13, 1944, Serial No. 544,697

7 Claims. (Cl. 128—2)

My invention relates to apparatus suitable for use in obtaining samples of spinal fluid and in measuring the pressure of spinal fluid.

The conventional method of obtaining samples of spinal fluid and of measuring spinal-fluid pressure involves the use of a spinal-puncture needle long enough to be inserted into the spinal column between two vertebrae and normally closed during insertion by a stylet which fills the lumen of the needle. After the needle has been properly inserted with its pointed end within the spinal column, the stylet is removed. The spinal fluid passes outwardly through the needle-lumen, and a sample in the desired amount is collected. When spinal-fluid pressure is to be measured, a manometer or other fluid-pressure indicating device is connected to the outer end of the needle, and the pressure as indicated by the device is observed.

This conventional method is accompanied by danger to the patient. Certain pathological conditions tend to produce a comparatively high fluid pressure within the spinal column, with the result that when the stylet is withdrawn from the needle-lumen a considerable quantity of fluid escapes through such lumen before the latter can be closed by other means. The loss of a comparatively large quantity of spinal fluid may, in itself, be dangerous; but a second danger arises from the relatively abrupt release of pressure in the spinal column For example, a tumor or abscess of the brain may be accompanied by a high fluid pressure within both the spinal column and cranium; and the uncontrolled release of a large quantity of spinal fluid upon withdrawal of the stylet from the spinal-puncture needle may cause such an abrupt drop in pressure within the column that brain tissue is displaced causing death of the patient. Even when the outer end of the needle is promptly connected to fluid-pressure indicating apparatus, some fluid may be lost in the interval between withdrawal of the stylet and the effecting of the connection to the pressure-indicating apparatus; and, moreover, the amount of fluid which is necessarily displaced from the spinal column in the operation of a manometer or other conventional pressure-indicating device represents a loss which may be undesirably excessive.

It is the object of my invention to produce apparatus by which samples of spinal fluid may be obtained and spinal-fluid pressure measured without the danger of large spinal-fluid losses and without the necessity for the displacement of a relatively large quantity of the spinal fluid to effect operation of the pressure-indicating device. Another object of my invention is to produce a spinal-puncture needle which will provide substantially complete control over the amount of fluid discharged from the spinal column after the needle-stylet has been withdrawn.

In carrying out my invention, I employ a needle provided with a valve. Conveniently, this valve takes the form of a plunger movable in the needle-body and provided with a passage adapted to be moved into and out of alinement with the needle-lumen. For measuring the pressure of the spinal fluid, I employ a sealed housing divided by a flexible diaphragm into two chambers, one of which is adapted for connection to the needle-lumen and the other of which is connected to a pressure-indicating device and to a means for supplying fluid under pressure. An indicator operatively connected to the diaphragm indicates the position thereof.

Figure 2:
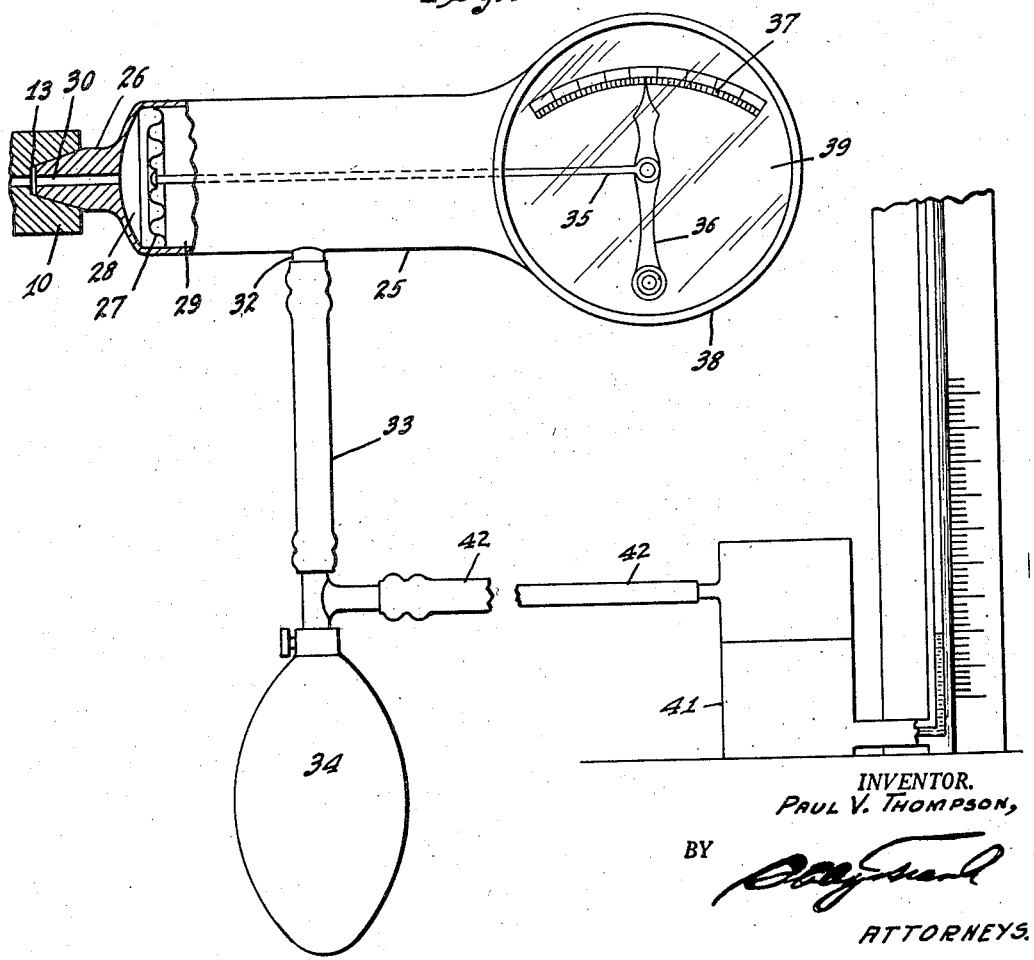

The accompanying drawing illustrates my invention: Fig. 1 is a longitudinal section on an enlarged scale through a spinal-puncture needle, and Fig. 2 is a front elevation showing the pressure-indicating apparatus.

The needle illustrated in the drawing comprises a body portion 10 and an elongated point 11, the latter being beveled at its end in the usual manner. The needle-body 10 and point 11 are provided with a continuous longitudinal passage or lumen adapted to receive a wire stylet 12. The outer end of the needle body 10 is provided with a frusto-conical recess 13 alined with the lumen and adapted to receive a frusto-conical boss 14 on a head 15 to which the stylet is connected. The features so far described are common to conventional spinal-puncture needles.

In my needle, I make the body 10 somewhat longer than that of the conventional needle, and I provide it with a transversely extending opening adapted to receive slidably a valve-plunger 16. The valve-plunger is provided with a transverse passage 17 which can receive the stylet 12. Associated with the plunger 16 is a yielding means which tends to move the plunger transversely of the body 10 to carry the opening 17 out of alinement with the needle-lumen. As shown, this yielding means is in the form of a curved wire spring 18 which passes through a hole in the end of the plunger 17 and has its ends bent and received in longitudinal guideways 19 in the side of the needle-body. The opposite end of the plunger 17 is provided with a head 20 which, by engagement with the needle-body 10, limits movement of the plunger under the influence of the spring 18. The head 20 also provides a means whereby the plunger can be drawn transversely of the needle-body 10, against the force exerted upon it by the spring 18, to the position in which the passage 17 is in alinement with the needle-lumen.

When the needle is to be used, the plunger 16 is moved against the pressure of the spring 18 until the passage 17 comes into alinement with the needle-lumen, and the stylet 12 is then put in place. Thereafter, the stylet, passing through the opening 17, holds the plunger 16 in the full-line position of Fig. 1 against the force exerted on the plunger by the spring 18. After insertion of the needle-point 11 into the spinal column, the stylet 12 is withdrawn. As soon as the stylet clears the plunger 16, the spring 18 moves that plunger to the dotted-line position shown in Fig. 1, thus carrying the passage 17 out of alinement with the needle-lumen and preventing the escape of any spinal fluid.

When spinal-fluid pressure is to be measured, apparatus similar to that of Fig. 2 may be employed. This apparatus comprises a hollow casing 25 provided at one end with a frusto-conical boss 26 adapted to be received in the recess 13 in the outer end of the needle-body 10. An elastic diaphragm 27 extends transversely of the casing 25 dividing it interiorly into two chambers 28 and 29. The chamber 28, which is that chamber nearest the boss 26, communicates with the needle-lumen through a passage 30.

The other chamber 29 of the casing 25 is adapted for connection to a device by which any desired fluid-pressure can be created within the chamber 29. As shown, the chamber 29 has a lateral outlet in the form of a short tube 32 which is adapted to be received within one end of a flexible rubber tube 33 extending to an air-pump 34. The air-pump shown is of the rubber-bulb type commonly used in sphygmomanometers, but any suitable means for building up a controlled pressure within the chamber 29 may be used.

The diaphragm 27 is operably connected, as by means of a rod 35, with a movable hand 36 adapted to swing over a fixed scale 37. The rod 35, the hand 36, and the scale 37 may all be located within an enlarged end 38 of the casing 25, the scale and hand being visible through a cover 39 of glass or other transparent material capable of being hermetically sealed in place. As the diaphragm 27 is elastic, it has a definite normal position which it occupies when the respective fluid-pressures on its opposite faces are equal. Such normal position of the diaphragm is indicated by suitable indicia on the scale 37.

For the purpose of determining fluid-pressure existing within the chamber 29, that chamber is connected to a manometer or other pressure-indicating device 41. Conveniently, this connection is effected through the medium of a flexible tube 42 connected to the tube 33 between the bulb 34 and the casing 25.

When the pressure-indicating apparatus is to be used, the needle-point 11 is inserted into the spinal column and the stylet 12 withdrawn as above described. The boss 26 is then inserted into the recess 13 in the outer end of the needle-body 10. If the plunger 16 is then moved to bring the valve passage 17 into alinement with the needle-lumen, communication between the interior of the spinal column and the chamber 28 will be established, and the fluid pressure existing within the spinal column will be transmitted to the chamber 28 to displace the diaphragm 27 and move the hand 36 from their respective normal positions. By properly locating the diaphragm 27 in the casing 25, the volume of the chamber 28 may be made comparatively small. As a result, only a small amount of spinal fluid need be displaced through the needle-lumen in equalizing fluid-pressure within the chamber 28 and within the spinal column. The bulb 34 is now operated to force air into the chamber 29 and to build up therein a fluid pressure tending to restore the diaphragm 27 to its normal position. Movement of the diaphragm is accompanied by movement of the hand 36 along the scale 37. When the diaphragm is returned to its normal position as indicated by the position of the hand 36 on the scale 37, fluid-pressure within the chamber 29 will equal that within the chamber 28; and since the latter pressure is equal to that within the spinal column, the pressure within the chamber 28, which may be determined by observation of the pressure-indicating device 41, will equal the fluid pressure in the spinal column.

If it is desired to study the dynamics of spinal-fluid pressure, movements of the hand 36 along the scale 37 may be observed to indicate at least qualitatively the character of the changes which are produced in spinal-fluid pressure as a result of the manipulation of the patient. A quantitative indication of such pressure changes may be obtained by varying the amount of air in the chamber 29 and observing the pressure indicated by the device 41 at the moment the hand 36 passes through its normal position.

It will be noted that the apparatus above described provides substantially complete control over the escape of fluid from the spinal column. Even before the stylet 12 has been completely withdrawn from the lumen, the valve-plunger 16 will have moved to occlude the lumen, and thus the escape of spinal fluid upon withdrawal of the stylet is prevented. If a sample of the spinal fluid is desired, the proper quantity can readily be obtained at a safe rate by proper manipulation of the plunger 16. When the pressure-indicating apparatus is used in association with the needle, its connection with the spinal column is under the control of the plunger 16.

As pointed out above, only a slight amount of fluid escapes from the spinal column in moving the diaphragm 27, because the chamber 28 is relatively small. Because of the air trapped within the chamber 28 when the boss 26 is connected to the needle-body 10, the amount of spinal fluid which escapes from the spinal column when the valve 16 is opened is materially less than that represented by the volume of the chamber 28. Since the displacement of the movable element of the pressure-indicating apparatus 41 results from the air pumped into the chamber 29 by the bulb 34, it bears no necessary relation to the amount of fluid displaced toward or into the chamber 28. In other words, the amount of fluid escaping into the chamber 28 may be but a small fraction of that which would be necessary if the pressure-indicating device 41 were directly connected to the needle-lumen. This result is made possible by the presence of the diaphragm 27 and by the fact that its movement is not employed as a direct measure of pressure but merely to indicate a state of balance or equality between the pressure of the spinal fluid and the selectively controlled and measured pressure within the chamber 29.

I claim as my invention:

1. In combination, a spinal-puncture needle having an axial lumen, a sealed housing, a flexible diaphragm dividing said housing into two chambers one of which is smaller than the other, the smaller of said chambers communicating with said needle-lumen, means for indicating movement of said diaphragm, means for supplying fluid under pressure to the larger of said chambers, and means for measuring the fluid pressure in said larger chamber.

2. In combination, a spinal-puncture needle having an axial lumen, a sealed housing, a flexible diaphragm dividing said housing into two chambers one of which communicates with said needle-lumen, means for supplying fluid under pressure to the other of said chambers, means for measuring the fluid pressure in such other chamber, and means for indicating movement of said diaphragm.

3. The invention set forth in claim 2 with the addition that said casing and needle are separable.

4. In a device for measuring fluid pressure within the spinal column, a housing, a flexible diaphragm dividing said housing interiorly into two chambers one of which is adapted for connection to the space within the spinal column, means for supplying fluid under pressure to the other of said chambers, a device for measuring the fluid pressure existing within such other chamber, and means for indicating movement of said diaphragm.

5. In a device for measuring the pressure of spinal fluid, a spinal-puncture needle having an axial lumen and an enlarged head through which the outer portion of said lumen extends, the outer end of said lumen being adapted for connection to a fluid-pressure measuring device, a valve member coplanar with said lumen and movable in said head, said valve member being provided with a passage which may be moved into or out of alinement with said lumen by movement of the valve member, means biasing said valve member toward a position in which its passage is out of alinement with said lumen, and a stylet insertable into said lumen and through the passage in said valve member to hold the latter in position against the influence of said biasing means.

6. In a spinal-puncture needle having an axial lumen and an enlarged head through which said lumen extends, a valve member coplanar with said lumen and movable in said head, said valve member being provided with a passage which may be moved into or out of alinement with said lumen by movement of the valve member, means biasing said valve member toward a position in which its passage is out of alinement with said lumen, and a stylet insertable into said lumen and through the passage in said valve member to hold the latter in position against the influence of said biasing means.

7. In a spinal-puncture needle having an axial lumen and an enlarged head through which said lumen extends, a valve member coplanar with said lumen and transversely movable in said head, said valve member being provided with a passage which may be moved into or out of alinement with said lumen by movement of the valve member, means biasing said valve member toward a position in which its passage is out of alinement with said lumen, and a stylet insertable into said lumen and through the passage in said valve member to hold the latter in position against the influence of said biasing means.

PAUL V. THOMPSON.